United States Patent [19]

Williams

[11] Patent Number: 4,746,338

[45] Date of Patent: May 24, 1988

[54] GAS FILTER

[75] Inventor: Clifford C. B. Williams, Tamworth, United Kingdom

[73] Assignee: Willpower Compressed Air Systems Limited, Bristol, England

[21] Appl. No.: 37,227

[22] Filed: Apr. 10, 1987

[30] Foreign Application Priority Data

Apr. 15, 1986 [GB] United Kingdom ............... 8609156

[51] Int. Cl.⁴ .......................................... B01D 19/00
[52] U.S. Cl. ...................................... 55/275; 55/387; 55/316; 55/482
[58] Field of Search ............... 55/275, 316, 387, 482, 55/498; 210/446, 453, 454, 335

[56] References Cited

U.S. PATENT DOCUMENTS

| | | | |
|---|---|---|---|
| 3,029,581 | 4/1962 | Robbins | 55/316 |
| 3,505,783 | 4/1970 | Graham | 55/275 |
| 3,527,027 | 9/1970 | Knight et al. | 55/275 |
| 3,705,480 | 12/1972 | Wireman | 55/275 |
| 3,724,177 | 4/1973 | Grote | 55/316 |
| 4,121,916 | 10/1978 | Fricke | 55/316 |
| 4,236,902 | 12/1980 | Fricke | 55/279 |
| 4,259,097 | 3/1981 | Patel et al. | 55/316 |

FOREIGN PATENT DOCUMENTS

| | | |
|---|---|---|
| 0162022 | 11/1985 | European Pat. Off. . |
| 0102593 | 4/1986 | European Pat. Off. . |
| 1157311 | 7/1969 | United Kingdom . |
| 1283677 | 8/1972 | United Kingdom . |
| 1417528 | 10/1975 | United Kingdom . |
| 1421651 | 1/1976 | United Kingdom . |
| 2030886 | 4/1980 | United Kingdom ............... 55/387 |
| 2035833 | 6/1980 | United Kingdom . |

Primary Examiner—Bernard Nozick
Attorney, Agent, or Firm—Marshall, O'Toole, Gerstein, Murray & Bicknell

[57] ABSTRACT

A gas filter comprises at least two separately dismountable self-contained filter sections each of which contains at least one gas purifying material effective to remove at least one contaminant from gas passed through filter. Each section comprises a cylindrical container having mounting means at each end thereof for joining to another filter section. Where it is required to remove more than one contaminant, each filter section may contain a different purifying material, for example one section contains a desiccant to remove water, and a second section contains activated charcoal to remove a further contaminant. The filter container walls are transparent and a water sensitive indicator strip is mounted on an inner face to provide visual indication of the level of water absorbed by the purifying material. A housing with transparent walls and removable cap for receiving the multi-section filter is also described.

9 Claims, 3 Drawing Sheets

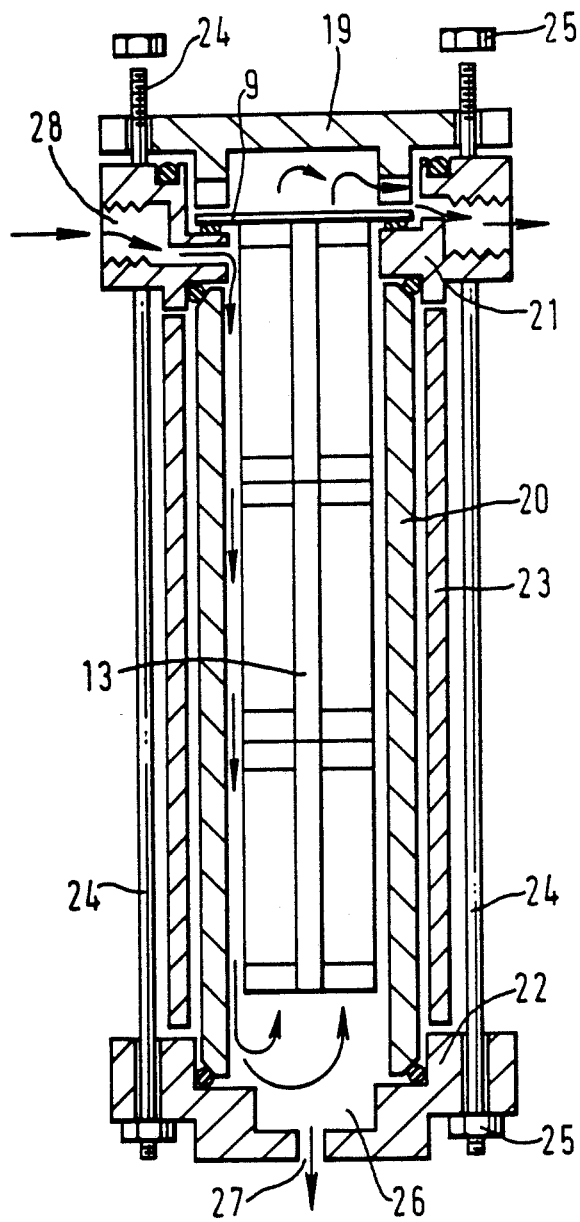
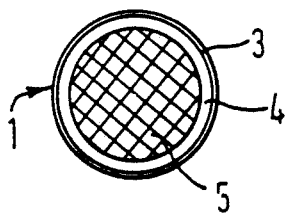
FIG. 1c.
FIG. 1b.

GAS FILTER

The present invention is concerned with a gas filter of the type in which a contaminated gas is passed through at least one filter material to remove contaminants. Such gas filters are used, for example, to remove liquid water, water vapour, oils and carbon monoxide etc. from compressed air supplies.

In patent specification GB-A-No. 1283677 there is disclosed a combination column comprising a plurality of sections (1) having transparent walls and that are joined together in end-to-end relationship, the sections being dismountable from one another. Material can be passed along the column sections (1) entering and exiting via nipples (6,9) provided in end and intermediate connection pieces (4,7,4) that sandwich the column sections (1) therebetween. A problem is that in mounting and demounting the column sections (1) the end and intermediate connection pieces (4,7,4) have to be disturbed and so replacement of column sections cannnot be effected without disturbing pipework connected to the nipples.

According to the present invention there is provided a gas filter through which gas is passed to remove contaminants, comprising a plurality of filter sections including gas purifying substances having transparent walls and that are joined to one another in end-to-end relationship for gas to be filtered to pass through each filter section in turn, the filter sections being removably mounted in a housing that has a closure cap at one end that is removable to permit mounting of the filter sections in the housing, the housing including connection means having gas inlet and outlet connections, this connection means being disposed to be undisturbed by removal of the filter sections, the housing having a transparent wall, the filter sections being provided with an internal water sensitive or oil sensitive contaminant sensitive strip, and these sensitive strips being viewable through the transparent walls of the filter sections and the housing, instructive materials carried by the filter sections also being visible through the housing. Since in this filter the filter sections can be removed without disturbing the connection means, pipework connected to the connections means is also undisturbed. In addition as the internal water sensitive strip, and the instructive material carried by the filter section, is visible from outside the filter, correct usage of the filter is assisted.

The invention will now be described, by way of example only, with reference to the accompanying drawings, in which:

FIG. 1(b) shows a side view of an assembled three sections multi-stage gas filter, inside the housing;

FIG. 1(c) shows an end view of the filter of FIG. 1(b); and

Figure 1A:
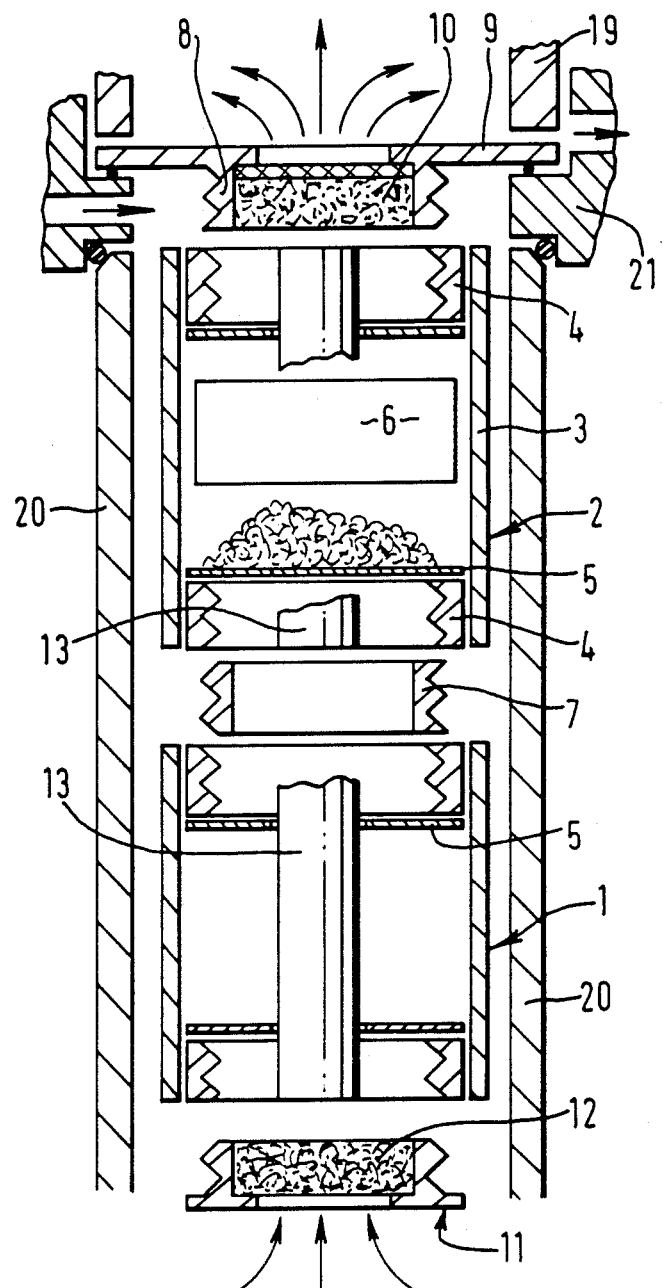
FIG. 1(a) shows a sectioned view of two sections only of a multi-stage gas filter.

The illustrated gas filter comprises two separate gas filter sections 1 and 2, which are joined together to form a composite multi-section, axial-flow gas filter cartridge. Each filter section comprises a cylindrical container 3 which has entry and exit orifices each defined by an end cap 4 in opposite ends of the cylinder to permit gas to pass through the cylinder. The interior of the cylinder 3 is filled with a gas-purifying substance or substances, in granular, rigid porous block or powdered form which remove one or more contaminnatns from the gas. The cylinder 3 is formed of a transparent plastic material.

The cap 4, which closes each end of the cylinder 3 and which defines the entry or exit orifice, is formed in the shape of a collar. A fine mesh retaining screen 5 is located adjacent the inner end of each cap 4. The contents of the cylinder 3 are contained in the space between the retaining screens 5. The end caps 4 are also formed preferably of a plastics material and, although formed as a push-fits into the cylinder 3, are retained in position by glue, welding, mechanical fastening, heat shrinking, thermoforming or injection moulding.

The internal surface of each cap 4 is screw-threaded to receive an externally threaded sleeve 7. The two filter sections 1,2 are joined together by screwing each onto opposite ends of an externally threaded sleeve 7. The length of the sleeve 7 and of the collar 4 in each cyliner 3 into which it is screwed may be arranged so that the cylinders 3 may be screwed onto the sleeve 7 until their adjacent ends abut one another. A seal, for example an O-ring seal, may be located between the abutting end faces of the adjacent cylinders.

Communication from one filter section to the adjacent section is provided through the interior of the sleeve 7 that interconnects the sections. The combined multi-section filter is mounted for use by screwing the threaded cap 4 in the free end of one of the filter sections on to an externally threaded boss 8 carried by a mounting flange 9. The boss 8 and flange 9 are apertured to provide a gas flow passage communicating with the flow passage through the filter.

A filter 10 is mounted in the internal passageway through the boss 8 leading, eventually, to a gas outlet. In the described embodiment, the passage extending through the boss 8 is formed with a shoulder facing towards the filter 10, forming an inwardly facing step against which the filter 10 is located.

A similarly stepped end cap 11 housing a further filter 12 is preferably screwed into the cap 4 at the opposite end of the filter cartridge. This filter screen comprises materials which are effective in removing water droplets and oil droplets from the gas entering the multi-section filter.

The side view of a three-section filter is shown at FIG. 1(b). The three sections are joined together using two sleeves 7, which when the sections are screwed into abutment are no longer visible. FIG. 1(c) shows an end view of the filter of FIG. 1(b). The cylindrical container 1 is shown in end view, the end cap is visible at 4 and the filter screen 5 is visible through the aperture in the cap 4. As will be apparent from the above description, each of the sections of the filter is constructed similarly and they may be assembled in any required order. It follows also, therefore, that each individual section is also separately dismountable so that individual filter sections may be placed as required. The connecting sleeves, end cap 11 and flange 9 can also be disassembled when filter sections are replaced and retained for further use with fresh, replacement sections. The internal space of each filter section, as mentioned above, is filled with a gas purifying material. Each section may contain several purifying substances, each removing a different contaminant from the gas passed through the filter. Alternatively, each section may contain a single purifying material and, where several contaminants must be removed, each section of a multi-section filter contains a different purifying substance. For example, in the case of compressed air, intended for breathing purposes, it is necessary to remove water vapour, carbon monoxide and any hydrocarbon present. (Hydrocarbons and carbon monoxide may be introduced by contamination by exhaust gasses and compressor lubricants). Water vapour is absorbed by passing the compressed air through a desiccant material. Hydrocarbons are normally removed by passing the gas through activated charcoal. Charcoal can be based on several raw materials, for example, anthracite, wood, or coconut shell. Charcoal granules in several sizes may be mixed together with a desiccant material if required. Different sized charcoal granules may be mixed together in one filter section, or contained in different filter sections or, again, different sized granules may be arranged in separate layers and contained within one filter section.

A separate catalyst is employed to remove carbon monoxide and this is mixed with the activated charcoal in at least one of the sections.

It is preferred, when arranging the filtering materials in the multi-section filter, to place the section containing the desiccant materials at the end of the filter through which gas enters, so that water is removed before the gas is passed through the remaining filter sections. Usually the most bulky contaminant present is water, in either droplet or vapour form. Generally, filter material s lose efficiency as the amount of retained water rises. Thus, when a filter section is fully saturated with water it is no longer effective and must be replaced. The present arrangement of dismountable filter sections allows the desiccant containing sections to be replaced separately when these become saturated, thus prolonging the useful life of the filter material in the remaining sections.

Each desiccant filter section contains a water sensitive indicator strip 13 mounted on the inside of the transparent wall of the filter so that it is visible through the wall. This indicator strip comprises an elongate fabric tape impregnated with water sensitive material which changes colour according to the amount of water absorbed by the adjacent filtering substance. The impregnating substance in the described embodiment is a cobalt salt which is blue when dry, and, as the water contamination rises, gradually changes to pink.

Although white tape is normally used, other colour variations can be obtained by choice of base colour of the original tape.

Thus, by observing the colour of the indicator tape in each filter section container, the water saturation level can be estimated and the filter section replaced when required.

The activated charcoal filter sections may also contain an oil sensitive tape impregnated with an oil-soluble dye to indicate contamination by oil, although normally the efficiency of such filter materials is gauged by the quality of air after passing through the filter, e.g. whether or not the smell of the contaminant can be detected in the filtered air.

An instruction label 6 showing the latest date of permitted installations, actual date of installation and expiry date, and other details such as part numbers, contract numbers and health and safety references, may be applied to the walls of each section.

Figure 2:
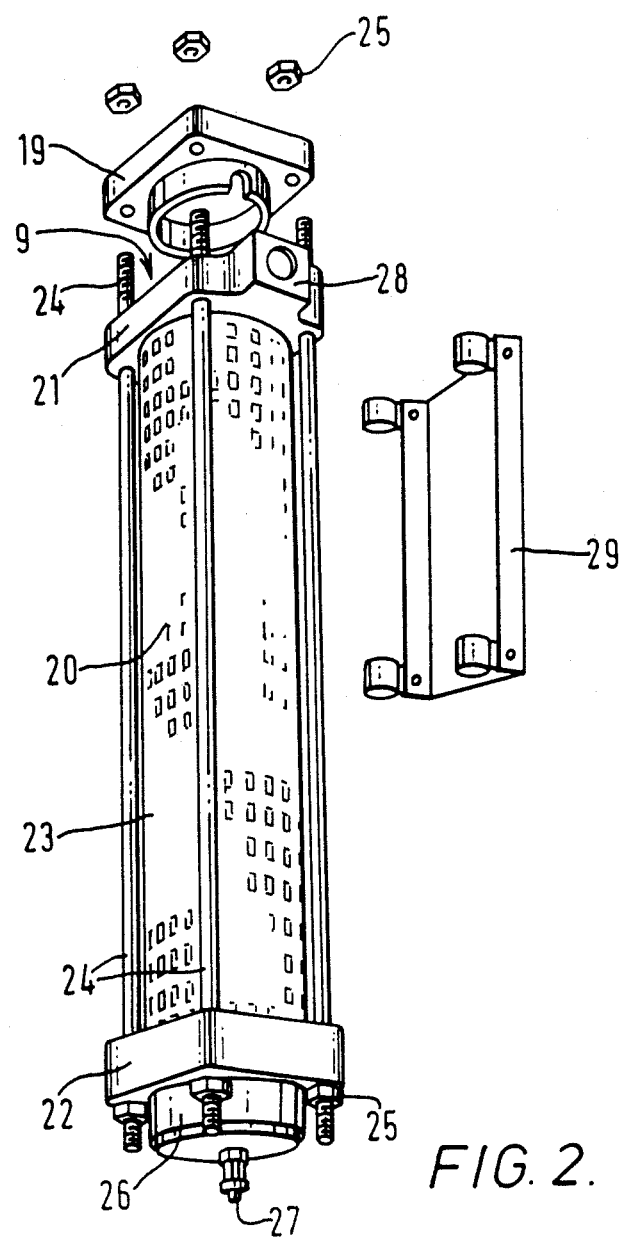
FIG. 2 shows a perspective view of a housing in which the filter sections are mounted.

Referring now to FIG. 2 there is shown a housing, which forms part of a compressed air system, for mounting the multi-section filter described above. The housing comprises a transparent walled cylindrical pressure vessel 20, part of which is also visible in FIG. 1(a). The cylindrical vessel 20 is secured between an upper end connection ring 21 and lower end cap 22. The cartridge boss 8 extends through the aperture of the upper ring 21. Clamping is achieved by elongated studs 24 screwed into the upper end ring 21 and which pass through the lower end cap 22 and lie along the length of the vessel 20. A closure cap 19 is retained in place to clamp the flange 9 of the filter cartridge against the upper end ring 21 by threaded nuts 25.

The multi-section cartridge, shown in FIG. 1(a), is passed through the upper ring 21 and therefore extends co-axially inside the cylindrical vessel 20. The length of the vessel 20, and also the clamp studs 24, is slightly longer than the overall length of the multi-section filter cartridge so that a dead space is left at the lower end of the housing.

The housing is normally mounted vertically, as shown in the drawing. The end cap 22 is formed with a sump 26, which, at its lowest point, is fitted with a drain plug or drain tap 27 for occasional draining of condensate.

In use, gas enters the filter housing at 28 and first passes below the flange 9 into the end space of the pressure vessel 20. In the illustrated housing, the gas is ducted to the interior of the end ring 22 through the annular space between the cartridge and the vessel which extends longitudinally of the housing. The air then passes up through the cartridge exit above flange 9 to the outlet connection.

A protective sleeve may be fitted over the outside of the pressure vessel 20, in the form of an open mesh 23. The open apertures of this sleeve permit the indicator strips of the filter cartridge contained within the vessel 20 to be viewed during use. A wall bracket 29 adapted to receive the housing is also illustrated in FIG. 2. This comprises a rectangular plate having outstanding portions on opposite sides to which is attached a pair of clamps. The upturned sides are spaced apart by the same distance as the studs 24 on one side of the housing and the housing is mounted by passing two adjacent studs through the clamps. The housing is supported at any position along its length by tightening the clamps at the desired position.

Exhausted cartridges are changed by removing top nuts 25 and top cap 19. The saturated cartridge is lifted out. A new cartridge is lowered into place. The cap 19 is replaced and nuts tightened to effect an airtight seal between cap 19, the flange 9 and cap 21.

I claim:
1. A gas filter through which gas is passed to remove contaminants, comprising a plurality of filter sections including gas purifying substances, having transparent walls and that are joined one to another in end-to-end relationship for gas to be filtered to pass through each filter section in turn, the filter sectins being removably mounted in a housing that has a closure cap at one end that is removable to permit mounting of the filter sections in the housing, the housing including connection means having gas inlet and outlet connections, this connection means being disposed to be undisturbed by removal of the filter sections, the housing having a transparent wall, the filter sections being provided with an internal water sensitive or oil sensitive contaminant sensitive strip, and these sensitive strips being viewable through the transparent walls of the filter sections and the housing, instructive material carried by the filter sections also being visible through the housing.

2. A gas filter according to claim 1, wherein the first separately dismountable filter section contains desiccant material.

3. A gas filter according to claim 1, wherein the indicator strip comprises a tap impregnated with cobalt salt.

4. A gas filter according to claim 1, wherein the filter sections contain several purifying substances effective to remove more than one contaminant and each substance is contained in a separate filter section.

5. A gas filter according to claim 4, wherein each separately dismountable filter section contains a different substance.

6. A gas filter according to claim 4, wherein at least one of said filter sections contains a plurality of filtering substances.

7. A gas filter according to claim 6, wherein in said one filter section the plurality of substances are arranged in layers transverse the general direction of gas flow.

8. A gas filter according to claim 1, wherein each filter section comprises a hollow container having at each end thereof means for mounting one filter section to another.

9. A gas filter according to claim 8, wherein means is provided adjacent the mounting means at each end of each filter section for retaining a filtering substance within a container.

* * * * *